(12) United States Patent
Hayslett et al.

(10) Patent No.: US 10,155,568 B2
(45) Date of Patent: Dec. 18, 2018

(54) INTERNAL GEAR HUB WITH SELECTABLE FIXED GEAR FOR ELECTRIC BIKE REGEN

(71) Applicant: GM Global Technology Operations LLC, Detroit, MI (US)

(72) Inventors: Steven L. Hayslett, Troy, MI (US); Shawn H. Swales, Canton, MI (US); David Begleiter, Toronto (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 563 days.

(21) Appl. No.: 14/814,707

(22) Filed: Jul. 31, 2015

(65) Prior Publication Data
US 2017/0029068 A1    Feb. 2, 2017

(51) Int. Cl.
| | | |
|---|---|---|
| *B62M 11/16* | (2006.01) | |
| *B62M 6/55* | (2010.01) | |
| *B62M 11/14* | (2006.01) | |
| B62M 9/06 | (2006.01) | |

(52) U.S. Cl.
CPC ............. *B62M 11/16* (2013.01); *B62M 6/55* (2013.01); *B62M 11/145* (2013.01); *B62M 9/06* (2013.01)

(58) Field of Classification Search
CPC ........ B62M 6/55; B62M 9/06; B62M 11/145; B62M 11/16
See application file for complete search history.

(56) References Cited

U.S. PATENT DOCUMENTS

| | | | | |
|---|---|---|---|---|
| 6,048,287 A | * | 4/2000 | Rohloff | B62M 11/18 475/289 |
| 2008/0108475 A1 | * | 5/2008 | Perng | B62M 6/55 477/4 |

* cited by examiner

*Primary Examiner* — Huan Le
(74) *Attorney, Agent, or Firm* — Lorenz & Kopf, LLP

(57) ABSTRACT

A number of variations may include a product that may comprise a gear set, and first, second and third mechanical mechanisms. Each mechanical mechanism may alternatively be open or closed and each may be connected to the gear set. The mechanical mechanisms may be variously open or closed providing a number of gear ratios through the gear set. A fourth mechanical mechanism or a fixed connection may be included. A mode of operation may be provided where the first, second and third mechanical mechanisms are open, and the fourth mechanical mechanism may be closed or the fixed connection may be provided.

16 Claims, 3 Drawing Sheets

INTERNAL GEAR HUB WITH SELECTABLE FIXED GEAR FOR ELECTRIC BIKE REGEN

TECHNICAL FIELD

The field to which the disclosure generally relates includes electric cycles and more particularly, electric cycles having driven internal gear hubs.

BACKGROUND

An electric cycle may have various wheel arrangements and may include an on-board electric motor that can be used for propulsion through one or more gears.

SUMMARY OF ILLUSTRATIVE VARIATIONS

A number of variations may include a product that may comprise a gear set, and first, second and third mechanical mechanisms. Each mechanical mechanism may alternatively be open or closed and each may be connected to the gear set. The mechanical mechanisms may be variously open or closed providing a number of gear ratios through the gear set. A fourth mechanical mechanism or a fixed connection may be included. A mode of operation may be provided where the first, second and third mechanical mechanisms are open, and the fourth mechanical mechanism may be closed or the fixed connection may be provided.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
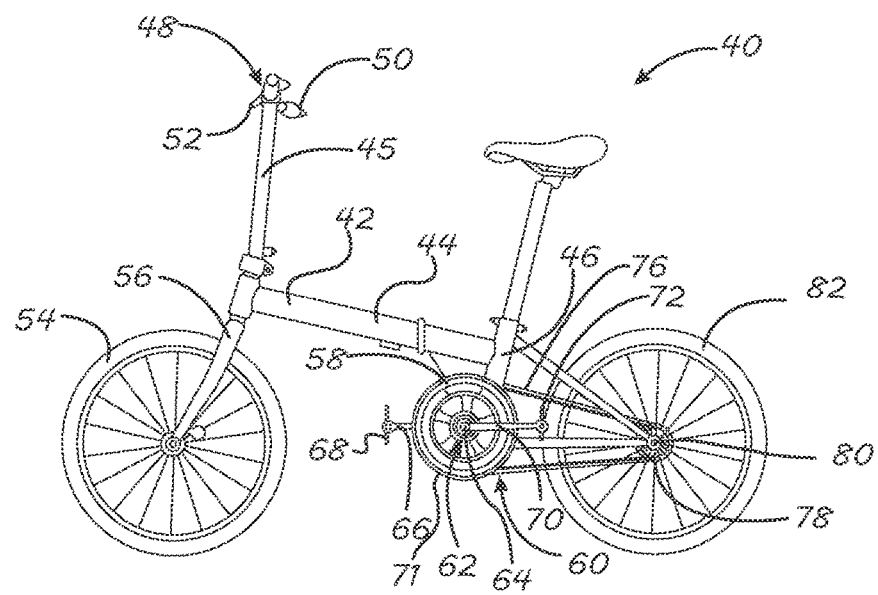
FIG. 1 illustrates a side view of an electric cycle according to a number of variations.

FIG. 1 illustrates a number of variations which may include an electric cycle 40. In any of a number of variations, the electric cycle 40 may include a frame 42 which may include a top tube 44 connected to a seat tube 46. A steering tube 45 may extend from the top tube 44. The steering tube 45 may be operatively connected to a front fork 56 which may be attached to a front wheel 54. Handlebars 48 may be attached to the steering tube 45 and may be used to control the direction of the front wheel 54 by way of the front fork 56. Control levers 50 may be provided on the handlebars 48 and may be constructed and arranged to communicate with one or more electronic control devices 58, one or more mechanical mechanisms as described below, and/or a motor/generator 60, as will be described below. Any mechanical mechanisms may be mechanically or electrically operated in a number of variations. The one or more electronic control devices 58 may include electronic processing components to receive input signals and to send out signals to control various components of the electric cycle 40, which may include sending output signals to control operation of the electric motor/generator 60. In a number of variations the one or more electronic control devices 58 may include memory, a processor and software and/or hardware to process input signals and generate output signals, and may include formulas, lookup tables or other means for comparing and processing data. A brake lever 52 may also be provided on the handlebars 48, if desired.

The electric cycle 40 may also include a crank assembly 62 which may include a crankshaft 64 having a first pedal assembly 66 and a second pedal assembly 70 connected thereto. The first pedal assembly 66 may include a first foot pedal 68, and the second pedal assembly 70 may include a second foot pedal 72. A linked element 71, which may be a sprocket, a pulley, or other mechanism, may be operatively connected to the crankshaft 64 for driving a linking member 76. The linking member 76 may be a chain or belt or another form of link suitable for engaging the linked element 71. The linking member 76 may be operatively connected to a rear linked element 78, which may be a sprocket, a pulley, or other mechanism and which may be operatively connected to a hub 80 of a rear wheel 82. The hub 80 may include a case that may be fixedly connected to rotate with the rear wheel 82 such as through a series of spokes.

The electric cycle 40 may be constructed and arranged to allow a rider to rotate the first and second pedal assembly 66, 70 in a full clockwise or counter clockwise rotation to power the electric cycle 40 or may allow a rider to use a pedal force-based propulsion system wherein the first and second pedal assemblies 66, 70 may be fixed in an approximately horizontal position so that a rider may provide intuitive input commands by applying a force to a first foot pedal 68 attached to the first pedal assembly 66 or a second foot pedal 72 attached to the second pedal assembly 70 in the clockwise or counter clockwise direction. The input commands may be intuitive to the rider and may be similar to riding a non-motorize cycle wherein the rider applies a clockwise force to a cycle crank by applying force to a forward positioned foot pedal to move the cycle in a forward direction, and the rider applies a counter clockwise force to the cycle crank by applying force to a rearward positioned foot pedal to slow the cycle. Reference herein as to clockwise or counter-clockwise is made with respect to the right hand side of the cycle with an operator facing the forward direction of movement of the electric cycle 40. The electric cycle 40 may be a bicycle, tricycle, or four-wheel electric cycle having a crank assembly 62 constructed and arranged to allow a rider to provide input thereto using the first pedal assembly 66 and the second pedal assembly 70.

Figure 2:
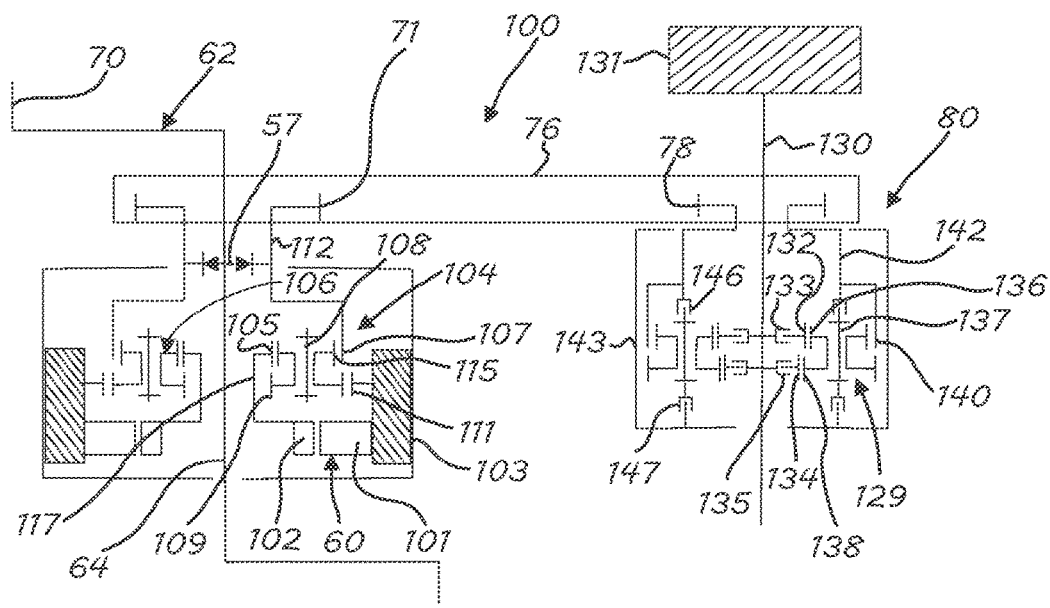
FIG. 2 illustrates a schematic of an electric cycle powertrain according to a number of variations.
Figure 3:
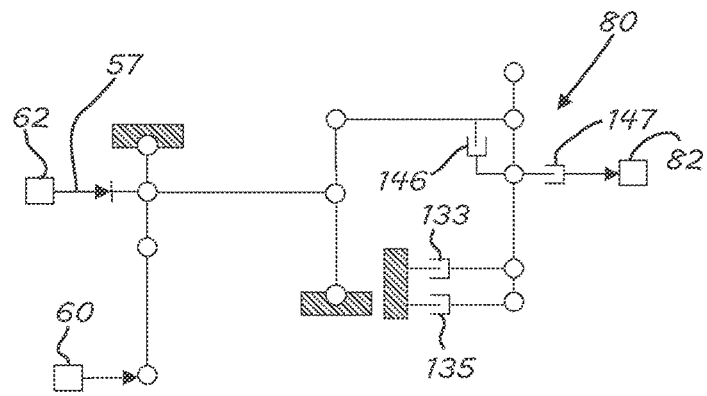
FIG. 3 illustrates lever diagrams for an electric cycle powertrain according to a number of variations.

A number of variations as illustrated in FIG. 2 are shown in schematic diagram form and in FIG. 3 are shown in lever diagram form. Referring to FIGS. 2 and 3 along with FIG. 1, in a number of variations the electric cycle 40 may include a product 100 with the electric motor/generator 60 which may be used to propel the electric cycle 40 forward and to generate electricity from motor/generator braking. The motor/generator 60 may be attached to the electric cycle 40 such as at frame 42 adjacent the pedal assemblies 66, 70, linked element 71 and/or crankshaft 64. The motor/generator 60 may include any of a number of types of motor/generators suitable for mid-drive cycle systems including, but not limited to, a brushless ring motor. The motor/generator 60 may include a stator 101 and a rotor 102. The rotor 102 may rotate within the stator 101 which may be held or grounded to a case 103. The motor/generator 60 may be powered by a battery or any number of batteries or battery assemblies. In a number of variations, one or more gear sets may be located within the motor/generator 60. In one variation, a gear set 104, which may be a planetary gear set, or which may be a compound planetary gear set, may be operatively connected with the motor/generator 60 and may be included therewith as part of a common assembly, and may be used to provide an advantageous gear ratio for the motor/generator 60.

In a number of variations, the gear set 104 may include a gear 105 that may be a sun gear, and which may be operatively engaged with the rotor 102 of the motor/generator 60 directly, or through a torque transfer element 117. In a number of variations the gear 105 may be operatively engaged or meshed with one or more gears 106, which may be planet gears so that when the gear 105 is rotated, it may cause the one or more gears 106 to rotate within a gear 107. The gear 107 may be a ring gear with internal teeth. In a number of variations, the one or more gears 106 may be operatively connected to a carrier 108 and in various states may cause the carrier 108 to rotate when the one or more gears 106 may be rotated. The one or more gears 106 may be dual pinion gears, which may be stepped pinions, with a larger diameter pinion 109 engaged or meshing with a gear 111, and a smaller diameter pinion 115 engaged or meshing with the gears 105, 107. The gear 111 may be a ring gear with internal teeth and may be held or grounded to the case 103 so as to not rotate. The gear 107 may be a ring gear with internal teeth.

The gear set 104 may be operatively connected to the linking member 76 through the linked element 71. The linking member 76 may drive, or be driven by the linked element 71 or the rear linked element 78. In a number of variations, the gear set 104 may be operatively connected with, and driven by, the rotor 102 of the motor/generator 60. Gear 105 may rotate the one or more gears 106 and the carrier 108. With gear 111 held or grounded, which may prevent its rotation, the one or more gears 106 may travel around the inside of the gear 111 and the carrier 108 may rotate in the same direction as the rotor 102 and at a slower speed. This may allow for high speed input from the motor/generator 60 to the linked element 71 through the gear set 104.

In a number of variations output from the gear set 104 may be provided from the gear 107 to the linked element 71 and may be delivered through a torque transfer element 112. From the pinion 115, torque may be transferred through a torque transfer element 112. The torque transfer element 112 may be a tube or other structure for engagement between the gear 107 and the linked element 71, and may be a part of the gear 107 or a connected component.

In a number of variations the crank assembly 62 may include a crankshaft 64 that may extend through the gear set 104 including through the torque transfer element 112. The crank assembly 62 may be connected with the torque transfer element 112 through a mechanical mechanism 57. In a number of variations, the mechanical mechanism 57 may include a clutch and/or may include a one-way clutch mechanism so that the torque transfer element 112 may be driven by the motor/generator 60 or by the linked element 71 faster than the crankshaft 64. In a number of variations, the mechanical mechanism 57 may be constructed and arranged so that when the mechanical mechanism 57 is closed or engaged in an operative one-way mode, torque may be provided through it to the linked member 71 from rotation of the crank assembly 62.

In a number of variations the hub 80 may include a shaft 130 that may be an axle shaft and that may be engaged with the ground 131, which may occur through the rear wheel 82. The shaft 130 may be connected with a gear set 129 at a gear 132, which may be a sun gear, through a mechanical mechanism 133. The mechanical mechanism 133 may be a clutch or may include a sliding key clutch or may be another mechanical mechanism that may provide driving torque between the gear 132 and the shaft 130 when closed, and that may permit relative rotation between the shaft 130 and the gear 132 when open. In a number of variations the shaft 130 may be connected with the gear set 129 through a gear 134, which may be a sun gear, through a mechanical mechanism 135. The mechanical mechanism 135 may be a clutch or may include a sliding key clutch or another mechanical mechanism that may provide driving torque between the gear 134 and the shaft 130 when closed, and that may permit relative rotation between the shaft 130 and the gear 134 when open. The gear 132 may mesh with a gear 136, which may be a planet gear, and the gear 134 may mesh with a gear 138 that may be a planet gear. In a number of variations the gears 136 and 138 may each be one of one of more planet gears carried by a carrier 137. The gears 136 and 138 may be engaged with one another and the gears 136 and 138 may be different sized pinions of a stepped planet gear arrangement. The Gear 138 may have a larger diameter and the gear 136 may have a smaller diameter to provide different gear ratios. In a number of variations the mechanical mechanisms 133 and 135 may be included in one clutch assembly such as one sliding key clutch assembly on the shaft 130.

In a number of variations the gear 136 may mesh with a gear 140, which may be a ring gear that may include internal teeth. The gear 140 may be connected to a torque transfer element 142 that may be connected to the linked element 78. This connection may enable driving the shaft 130 from the linked element 78 through the gear set 129 for propulsion, and may enable driving the linked element 78 from the shaft 130 for regenerative braking and/or charging.

In a number of variations the carrier 137 may be engaged with the torque transfer element 142 through a mechanical mechanism 146 so that the linked element 78 may rotate with the carrier 137. The mechanical mechanism 146 may be a clutch or may include a sliding key clutch or may be another mechanical mechanism that may provide torque transfer between the carrier 137 and the torque transfer element 142 and the connected linked element 78 when closed, and may permit relative rotation between the carrier 137 and the torque transfer element 142 and the connected linked element 78 when open. In a number of variations the carrier 137 may be connectable with the case 143 through a mechanical mechanism 147. The mechanical mechanism 147 may be a clutch that may be a one way clutch or that may be a selectable one way clutch, or that may be a bi-directional selectable one way clutch. The mechanical mechanism 147 may provide torque transfer between the carrier 137 and the case 143 when closed, or may provide relative rotation between the carrier 137 and the case 143 when open, or may provide torque transfer in one direction of rotation and overrunning operation in the other direction of rotation.

Chart 1 below illustrates 10 possible modes (modes a1-a10), for operation of the product 100 through the variations illustrated in FIGS. 1-3. For example, a selectable fixed mode such as a gear 1 driving mode may be provided by placing mechanical mechanisms 135 (E1), 147 (E4) and 57 (E5) in a closed state and mechanical mechanisms 133 (E2) and 146 (E3) in an open state. In gear one driving mode the crank assembly 62 may provide torque to the linked element 71 through the mechanical mechanism 57 and the torque transfer element 112. The motor/generator 60 may provide torque to the linked element 71 through the torque transfer element 117, the gear 105, the gear 107 and the torque transfer element 112. The linked element 71 may provide torque to the linked element 78 through the linking member 76. The linked element 78 may transfer torque through the torque transfer element 142, the gear 140, the gears 136 and 138, the mechanical mechanism 147 and the case 143. The shaft 130 held or grounded at 131, causes the rotating gears 136, 138 to drive the carrier 137 to travel around the shaft 130 and rotate the case 143 and the connected wheel 82.

Also for example, as shown in chart 1 a low spin loss mode (geared coasting), may be provided by placing mechanical mechanisms 135 (E1), 133 (E2) and 146 (E3) in an open state and mechanical mechanism 147 (E4) in a closed state. In this mode the mechanical mechanism 57 (E5) may operate in an overrunning state. In this mode the coasting wheel 82 may drive the connected case 143 to rotate, which may drive the carrier 137 to rotate driving the linked element 78 through the gears 136, 140 and the torque transfer element 142. Rotation of the connected linked elements 78 and 71 may cause the torque transfer element 112 to overrun the crankshaft 64 and the pedal assemblies 66, 70 may remain stationary.

CHART 1

| Mode | Pedal State | 135 (E1) | 133 (E2) | 146 (E3) | 147 (E4) | 57 (E5) | Result |
|---|---|---|---|---|---|---|---|
| a1 | pedaling | X | | | X | X | Gear 1 Driving |
| a2 | coasting | X | | | X | ◯ | Gear 1 Regen |
| a3 | coasting | X | | | ◯ | ◯ | Gear 1 Coasting |
| a4 | pedaling | | X | | X | X | Gear 2 Driving |
| a5 | coasting | | X | | X | ◯ | Gear 2 Regen |
| a6 | coasting | | X | | ◯ | ◯ | Gear 2 Coasting |
| a7 | pedaling | | | X | X | X | Gear 3 Driving |
| a8 | coasting | | | X | X | ◯ | Gear 3 Regen |
| a9 | coasting | | | X | ◯ | ◯ | Gear 3 Coasting |
| a10 | coasting | | | | X | ◯ | Geared Coasting |

Figure 4:
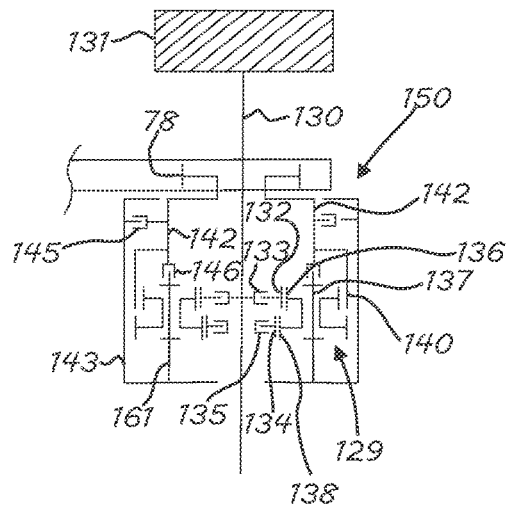
FIG. 4 illustrates a schematic of part of an electric cycle powertrain according to a number of variations.
Figure 5:
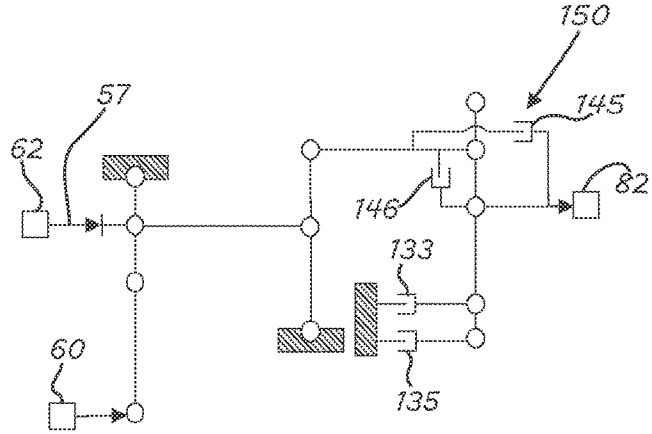
FIG. 5 illustrates lever diagrams for an electric cycle powertrain according to a number of variations.

A number of variations as illustrated in the hub diagram of FIG. 4 and the lever diagram of FIG. 5, may include a hub 150 that has a number of elements indicated by the same reference numerals as used in FIG. 2 that are the same as the elements of the hub 80. The hub 150 may omit the mechanical mechanism 147 so that the carrier 137 may not be engaged through it to the case 143, but instead the carrier 137 may be connected to the case 143 through a torque transfer element 161. As a result, the modes associated with an open mechanical mechanism 147 (E4) do not occur. The torque transfer element 161 may be a direct connection between the carrier 137 and the case 143 which may be through a keyed, splined or another connection.

The hub 150 may include a mechanical mechanism 145. In a number of variations the torque transfer element 142 may be connected to the case 143 through the mechanical mechanism 145, when closed. The case 143 may rotate with the linked element 78 and may be fixedly connected therewith when the mechanical mechanism 145 is closed or operatively engaged in a one-way mode. The mechanical mechanism 145 may be a clutch that may be a one way clutch or that may be a selectable one way clutch, or that may be a bi-directional selectable one way clutch.

Chart 2 below illustrates 10 possible modes (modes b1-b10), that may be provided by the hub 150 through the variations illustrated in FIGS. 1, 4 and 5. For example, a gear 1 driving mode may be obtained by placing mechanical mechanisms 135 (E1) and 57 (E5) in a closed state, and mechanical mechanisms 133 (E2), 146 (E3) and 57 (E6) in an open state. Also for example, a low spin loss mode (geared coasting), may be provided with the included torque transfer element 161, by placing mechanical mechanisms 135 (E1), 133 (E2), 146 (E3) and 145 (E6) in an open state and mechanical mechanism 147 (E4) in a closed state. In this mode the mechanical mechanism 57 (E5) may operate in an open or overrunning state.

CHART 2

| Mode | Pedal State | 135 (E1) | 133 (E2) | 146 (E3) | 57 (E5) | 145 (E6) | Result |
|---|---|---|---|---|---|---|---|
| b1 | pedaling | X | | | X | | Gear 1 Driving |
| b2 | coasting | X | | | ◯ | | Gear 1 Coasting |
| b3 | pedaling | | X | | X | | Gear 2 Driving |
| b4 | coasting | | X | | ◯ | | Gear 2 Coasting |
| b5 | pedaling | | | X | X | X | Gear 3 Driving |
| b6 | pedaling | | | x | x | | Gear 3 Driving |
| b7 | pedaling | | | | x | x | Gear 3 Driving |
| B8 | coasting | | | X | ◯ | | Gear 3 Coasting |
| b9 | coasting | | | X | ◯ | X | Regen Mode |
| b10 | coasting | | | | | | Geared Coasting |

Figure 6:
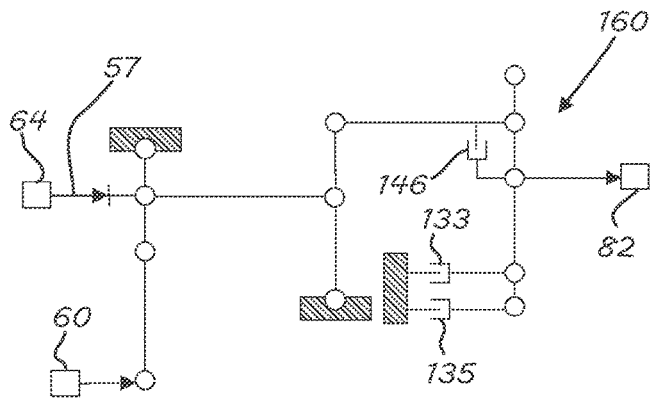
FIG. 6 illustrates lever diagrams for an electric cycle powertrain according to a number of variations.

A number of variations as illustrated in the lever diagram of FIG. 6 may include a hub 160 that has a number of elements indicated by the same reference numerals as used in FIG. 3 that are the same as the elements of the product 100. The hub 160 may omit the mechanical mechanism 147 so that the carrier 137 may not be connected through it to the wheel 82, and may omit the mechanical mechanism 145 so that the torque transfer element 142 may not be connected through it to the wheel 82. As result, the modes associated with closed mechanical mechanisms 147 (E4) and 145 (E6) may not occur.

Chart 3 below illustrates 7 possible modes (modes c1-c7), for operation of the hub 160 through the variations illustrated in FIGS. 1 and 6. For example, Gear 1 driving may be obtained by placing mechanical mechanisms 135 (E1) and 57 (E5) in a closed state and mechanical mechanisms 133 (E2) and 146 (E3) in an open state. Also for example, a low spin loss mode (geared coasting), may be provided by placing mechanical mechanisms 135 (E1), 133 (E2) and 146 (E3) in an open state. In this mode the mechanical mechanism 57 (E5) at the crank assembly 62 may operate in an open or an overrunning state.

CHART 3

| Mode | Pedal State | 135 (E1) | 133 (E2) | 146 (E3) | 57 (E5) | Result |
|---|---|---|---|---|---|---|
| c1 | Pedaling | X | | | X | Gear 1 Driving |
| c2 | Coasting | X | | | ○ | Gear 1 Regen |
| c3 | Pedaling | | X | | X | Gear 2 Driving |
| c4 | Coasting | | X | | ○ | Gear 2 Regen |
| c5 | Pedaling | | | X | X | Gear 3 Driving |
| c6 | Coasting | | | X | ○ | Gear 3 Regen |
| c7 | Coasting | | | | ○ | Geared Coasting |

Figure 7:
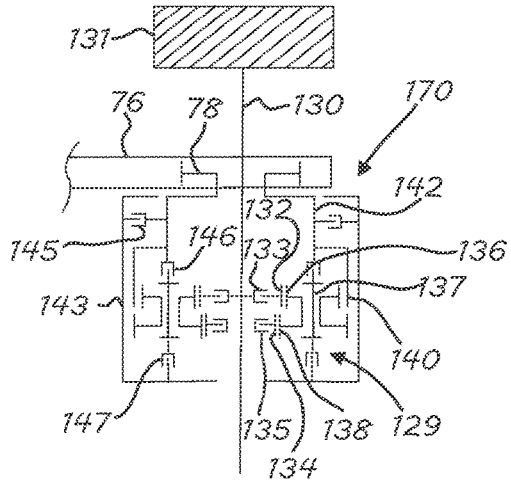
FIG. 7 illustrates a schematic of part of an electric cycle powertrain according to a number of variations.
Figure 8:
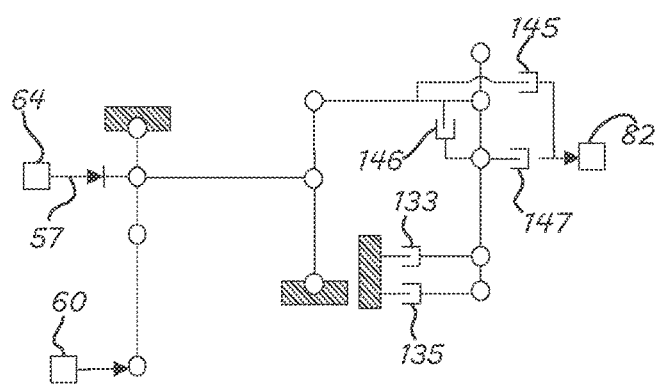
FIG. 8 illustrates lever diagrams for an electric cycle powertrain according to a number of variations.

A number of variations as illustrated in FIG. 7 and the lever diagram of FIG. 8 may include a hub 170 that has a number of elements indicated by the same reference numerals as used in FIGS. 2 and 3 that are the same as the elements of the hub 80. The hub 170 may include the mechanical mechanism 145. In a number of variations the torque transfer element 142 may be connected to the case 143 through the mechanical mechanism 145, when closed. The case 143 may rotate with the linked element 78 and may be fixedly connected therewith when the mechanical mechanism 145 is closed or operatively engaged in a one-way mode. The mechanical mechanism 145 may be a clutch that may be a one way clutch or that may be a selectable one way clutch, or that may be a bi-directional selectable one way clutch.

Chart 4 below illustrates 22 possible modes (modes d1-d22), for operation of the variations of FIGS. 7 and 8. For example, a gear 1 driving mode may be achieved by placing mechanical mechanisms 135 (E1), 147 (E4), and 57 (E5) in a closed state, and mechanical mechanisms 133 (E2), 146 (E3), and 145 (E6) in an open state. In addition, the hub 170 is capable of providing all modes listed in charts 1, 2 and 3.

CHART 4

| Mode | Pedal State | 135 (E1) | 133 (E2) | 146 (E3) | 147 (E4) | 57 (E5) | 145 (E6) | Result |
|---|---|---|---|---|---|---|---|---|
| d1 | pedaling | X | | | X | X | X | Wheel lockup |
| d2 | pedaling | X | | | X | X | | Gear 1 driving |
| d3 | coasting | X | | | X | | X | Wheel lockup |
| d4 | coasting | X | | | X | | | Gear 1 regen |
| d5 | pedaling | X | | | | X | X | Gear 3 driving |
| d6 | pedaling | X | | | | X | | Geared coasting |
| d7 | coasting | X | | | | | X | Gear 3 regen |
| d8 | Coasting | X | | | | | | Geared coasting |
| d9 | pedaling | | X | | X | X | X | Wheel lockup |
| d10 | pedaling | | X | | X | X | | Gear 2 driving |
| d11 | coasting | | X | | X | | X | Wheel lockup |
| d12 | coasting | | X | | X | | | Gear 2 regen |
| d13 | pedaling | | X | | | X | | Geared coasting |
| d14 | pedaling | | X | | | X | X | Gear 3 driving |
| d15 | coasting | | X | | | | X | Gear 3 regen |
| d16 | pedaling | | | X | X | X | | Gear 3 driving |
| d17 | pedaling | | | X | X | X | | Gear 3 driving |
| d18 | coasting | | | X | X | | X | Gear 3 regen |
| d19 | coasting | | | X | X | | | Gear 3 regen |
| d20 | pedaling | | | X | | X | X | Gear 3 driving |
| d21 | pedaling | | | X | | X | | Geared coasting |
| d22 | coasting | | | X | | | X | Gear 3 regen |

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product that may have a gear set, and may have first, second and third mechanical mechanisms where each may alternatively open or closed and each may be connected to the gear set. The first, second and third mechanical mechanisms may variously be open or closed and may provide a number of gear ratios through the gear set. At least one of a fourth mechanical mechanism or a fixed connection may be included. A mode of operation may be provided where: (a) the first, second and third mechanical mechanisms may be open, and (b) the fourth mechanical mechanism may be closed or the fixed connection may be provided.

Variation 2 may include the product according to variation 1 and may include a wheel. The at least one of a fourth mechanical mechanism or a fixed connection may be connected between the gear set and the wheel.

Variation 3 may include the product according to variation 2 wherein the gear set may be housed in a case. The case may be connected between the at least one of the fourth mechanical mechanism or the fixed connection, and the wheel.

Variation 4 may include the product according to variation 3 and may include a fifth mechanical mechanism that may be connected between the gear set and the case.

Variation 5 may include the product according to any of variations 1 through 4 and may include both the fourth mechanical mechanism and the fixed connection.

Variation 6 may include the product according to any of variations 1 through 5 wherein the first, second, third and fourth mechanical mechanisms may comprise clutches.

Variation 7 may include the product according to any of variations 1 through 6 and may include a case disposed around the gear set and a sprocket connected with the gear set. The gear set may include a carrier that may carry at least one gear. The third mechanical mechanism may be connected between the sprocket and the carrier. A torque transfer element may extend between the sprocket and the third mechanical mechanism. A fifth mechanical mechanism may be connected between the torque transfer element and the case.

Variation 8 may include the product according to variation 7 wherein the fourth mechanical mechanism may be connected between the carrier and the case.

Variation 9 may include the product according to variation 8 and may include a shaft that may extend through the gear set. The first and second mechanical mechanisms may be connected between the shaft and the gear set.

Variation 10 may include a product that may have a wheel and may include a hub. A linked element may be engaged with the hub and may provide input to, and output from, the hub. A torque transfer element may be engaged with the hub and may provide input to, and output from, the hub. First, second and third mechanical mechanisms may be alternatively open or closed and may provide a number of gear ratios through the hub between the linked element and the torque transfer element. At least one of a fourth mechanical mechanism or a fixed connection may be provided through which the hub may provide a mode of operation where the first, second and third mechanical mechanisms may be open. The at least one of the fourth mechanical mechanism or the fixed connection may be connected between the gear set and the wheel.

Variation 11 may include the product according to variation 10 wherein the linked element may be a sprocket. A crank and a chain may be included wherein the sprocket may be drivable by the crank through the chain.

Variation 12 may include the product according to variation 10 or 11 and may include a motor engaged with the chain.

Variation 13 may include the product according to variation 11 or 12 and may include a hub wherein the gears set may be disposed in the hub. A fifth mechanical element may be disposed in the hub and may be connected with the gear set.

Variation 14 may include the product according to variation 11 and may include a fifth mechanical mechanism that may be positioned between the crank and the chain.

Variation 15 may include a hub that may provide a selectable fixed mode between a crank and a wheel. A linked element may be engaged in torque transfer between the hub and the crank. A torque transfer element may be engaged between the hub and the wheel. A closeable mechanical mechanism, that when closed, may provide the selectable fixed mode by connecting the linked element to the wheel through the torque transfer element.

Variation 16 may include the hub according to variation 15 wherein a selectable coasting mode may be provided when the mechanical mechanism is open or overrunning.

Variation 17 may include the hub according to variation 15 or 16 wherein the mechanical mechanism may be a selectable one-way clutch.

Variation 18 may include the hub according to any of variations 15 through 17 wherein the torque transfer element may be a case of the hub.

Variation 19 may include the hub according to any of variations 15 through 18 wherein the linked element may be a sprocket.

Variation 20 may include the hub according to any of variations 15 through 19 and may include first, second and third clutches. The first clutch may provide a first gear when closed. The second clutch may provide a second gear when closed. The third clutch may provide a third gear when closed. The selectable fixed mode may be provided in each of the first, second and third gears.

The above description of select variations within the scope of the invention is merely illustrative in nature and, thus, variations or variants thereof are not to be regarded as a departure from the spirit and scope of the invention.

What is claimed is:

1. A product comprising: a hub with a gear set and first, second and third mechanical mechanisms in the hub, each of the first, second and third mechanical mechanisms configured to alternatively open or close, and at least one of a fourth mechanical mechanism or a fixed connection through which the hub is configured to operate in a mode with the first, second and third mechanical mechanisms open, and the hub is configured with an output from the gear set directed through the fourth mechanical mechanism or the fixed connection, a case disposed around the gear set and a sprocket connected with the gear set wherein the gear set includes a carrier carrying at least one gear and wherein the third mechanical mechanism is connected between the sprocket and the carrier, and a torque transfer element extending into the case and between the sprocket and the third mechanical mechanism, wherein the third mechanical mechanism is configured to selectively connect the sprocket with the carrier through both the torque transfer element and the third mechanical mechanism.

2. The product according to claim 1 further comprising a wheel wherein the fourth mechanical mechanism or the fixed connection is connected between the gear set and the wheel.

3. The product according to claim 1 further comprising a case wherein the gear set is housed in the case and the case is connected between a wheel and the fourth mechanical mechanism or the fixed connection.

4. The product according to claim 1 further comprising the sprocket disposed outside the hub, wherein the gear set includes a ring gear fixed with the sprocket.

5. The product according to claim 1 wherein the fourth mechanical mechanism comprises a clutch.

6. The product according to claim 1 wherein each of the first, second, third and fourth mechanical mechanisms is a clutch.

7. The product according to claim 1 wherein the fourth mechanical mechanism or the fixed connection is connected between the carrier and the case.

8. The product according to claim 7 further comprising a shaft extending through the gear set wherein the first and second mechanical mechanisms are connected between the shaft and the gear set.

9. A product comprising: a hub with a gear set and first, second and third mechanical mechanisms in the hub, each of the first, second and third mechanical mechanisms configured to alternatively open or close, and at least one of a fourth mechanical mechanism or a fixed connection through which the hub is configured to operate in a mode with the first, second and third mechanical mechanisms open, and the hub is configured with an output from the gear set directed through the fourth mechanical mechanism or the fixed connection, a linked element engaged with the hub providing input to, and output from, the hub, wherein the linked element is a sprocket, a crank and a chain wherein the sprocket is drivable by the crank through the chain, and a fifth mechanical mechanism positioned between the crank and the chain, the first, second, third mechanical mechanisms along with the fourth mechanical mechanism or the fixed connection, in combination, providing a number of gear ratios through the gear set.

10. The product according to claim 9 further comprising a motor engaged with the chain.

11. The product according to claim 9 wherein the gear set is disposed in the hub and further comprising the fifth mechanical element disposed in the hub and connected with the gear set.

12. A product comprising: a hub with a gear set configured to provide a number of gear ratios and configured to provide a selectable fixed mode, a linked element and a crank, each engaged in torque transfer with the hub, a torque transfer element engaged with the hub, and a mechanical mechanism or a fixed connection configured to close to provide the selectable fixed mode from the crank to the linked element through the torque transfer element, wherein the hub is configured to provide a selectable coasting mode provided when the mechanical mechanism is open or overrunning.

13. The product according to claim 12 wherein the mechanical mechanism is a selectable one-way clutch.

14. The product according to claim 12 wherein the torque transfer element is a case of the hub.

15. The product according to claim 12 wherein the linked element is a sprocket.

16. The product according to claim 12 further comprising first, second and third clutches, wherein the first clutch provides a first gear when closed, the second clutch provides a second gear when closed, the third clutch provides a third gear when closed and the selectable fixed mode is provided in each of the first, second and third gears.

* * * * *